(12) United States Patent
Corrain (10) Patent No.: US 11,301,653 B2
(45) Date of Patent: Apr. 12, 2022

(54) LASER LIGHT BEAM SCANNING DEVICE FOR READING CODED INFORMATION

(71) Applicant: Datalogic IP Tech S.R.L., Lippo di Calderara di Reno (IT)

(72) Inventor: Gabriele Corrain, Bologna (IT)

(73) Assignee: Datalogic IP Tech S.R.L., Bologna (IT)

(*) Notice: Subject to any disclaimer, the term of this patent is extended or adjusted under 35 U.S.C. 154(b) by 0 days.

(21) Appl. No.: 14/910,394

(22) PCT Filed: Aug. 6, 2013

(86) PCT No.: PCT/IT2013/000222
§ 371 (c)(1),
(2) Date: Feb. 5, 2016

(87) PCT Pub. No.: WO2015/019370
PCT Pub. Date: Feb. 12, 2015

(65) Prior Publication Data
US 2016/0180127 A1    Jun. 23, 2016

(51) Int. Cl.
*G06K 7/10*    (2006.01)

(52) U.S. Cl.
CPC ..... *G06K 7/10554* (2013.01); *G06K 7/10613* (2013.01); *G06K 7/10702* (2013.01)

(58) Field of Classification Search
CPC .......... G06K 7/10702; G06K 7/10881; G06K 7/10574; G06K 7/10613; G06K 7/10554; G06K 7/10564; G06K 7/10594; G06K 7/10831; G02B 27/283; G02B 26/08; G02B 27/28
See application file for complete search history.

(56) References Cited

U.S. PATENT DOCUMENTS 4,796,961 A * 1/1989 Yamada .............. G02B 26/106
                                                    359/218.1
6,114,712 A * 9/2000 Dvorkis ............ G06K 7/10594
                                                    235/472.01
(Continued)

FOREIGN PATENT DOCUMENTS

DE   10 2010 014783 A1    10/2011
EP    1 083 512 A1         3/2001

OTHER PUBLICATIONS

Notification of Transmittal of International Search Report and Written Opinion dated Aug. 6, 2013; 9 pps.

*Primary Examiner* — Christopher Stanford
(74) *Attorney, Agent, or Firm* — Foley & Lardner LLP (57) ABSTRACT

The present invention is relative to a scanning device (100) of a laser light beam (7,8) for reading coded information, comprising:
  an emission source of a laser light beam (7,8), the laser light beam defining an optical path (10a,10b);
  an optical element (17) for scanning the laser light beam on a support containing coded information;
characterized in that it further comprises a linear polarizer (16) located along the optical path (10a,10b) of said laser light beam (7,8), upstream the optical element for scanning (17), said polarizer being apt to linearly polarize a first portion of said laser light beam in substantially one first plane (s) and direct said polarized portion only towards said optical element for scanning.

22 Claims, 4 Drawing Sheets

(56) References Cited

U.S. PATENT DOCUMENTS

| | | | | |
|---|---|---|---|---|
| 6,177,979 B1* | 1/2001 | Oliva | ............... | G06K 7/10574 |
| | | | | 235/462.38 |
| 6,618,132 B1* | 9/2003 | Vann | ............... | G01S 17/42 |
| | | | | 235/384 |
| 7,059,523 B1* | 6/2006 | Yavid | ............... | H04N 3/08 |
| | | | | 235/454 |
| 7,075,687 B2* | 7/2006 | Lippert | ............... | G02B 26/08 |
| | | | | 235/462.11 |
| 7,202,985 B2* | 4/2007 | Miyagawa | ............... | G02B 26/123 |
| | | | | 347/224 |
| 7,834,867 B2* | 11/2010 | Sprague | ............... | G02B 27/1066 |
| | | | | 345/204 |
| 2006/0071075 A1* | 4/2006 | Moon | ............... | G06K 7/1094 |
| | | | | 235/454 |
| 2009/0108185 A1* | 4/2009 | Hoersch | ............... | G01V 8/14 |
| | | | | 250/225 |
| 2010/0254008 A1* | 10/2010 | Ono | ............... | G02B 1/11 |
| | | | | 359/580 |
| 2011/0248086 A1* | 10/2011 | Droemer | ............... | G06K 7/10702 |
| | | | | 235/455 |
| 2012/0104097 A1* | 5/2012 | Moran | ............... | G06K 7/0004 |
| | | | | 235/449 |
| 2012/0249969 A1* | 10/2012 | Ishimatsu | ............... | G02B 27/283 |
| | | | | 353/20 |
| 2013/0076800 A1* | 3/2013 | Hatagi | ............... | G02B 26/105 |
| | | | | 345/690 |

* cited by examiner

LASER LIGHT BEAM SCANNING DEVICE FOR READING CODED INFORMATION

CROSS REFERENCE TO RELATED APPLICATIONS

This application is a 371 National Stage Application of International Application No. PCT/IT2013/000222, filed Aug. 6, 2013, which is incorporated herein by reference in its entirety.

The present invention relates to a laser light beam scanning device for reading coded information.

Throughout the present description and the subsequent claims, with the term "reader of coded information" it is intended to indicate any device capable of acquiring information related to an object (for example, distance, volume, size or identifying data thereof) by acquiring and processing a light signal diffused or reflected from the same object. With the term: "coded information" it is intended to indicate the whole data contained in an optical code. With the term: "optical code" it is intended to indicate any graphical representation having the function of containing coded information. A particular example of optical code consists of linear or two-dimensional codes, wherein the information is codified by means of appropriate combinations of elements having a predetermined shape, for example squares, rectangles or hexagons, of dark colour (normally black) separated by clear elements (spaces, normally white), such as bar codes, stacked codes and two-dimensional codes in general, colour codes etc. The term "optical code" moreover comprises, more in general, also other graphical forms with information coding function, including printed characters (letters, numbers, etc.) and particular patterns (such as for example stamps, logos, signatures, fingerprints etc.). The term "optical code" moreover comprises graphical representations which can be detected not only in the visible light field but also in the entire range of wavelengths between the infrared and the ultraviolet.

Only for exemplificative purpose and in order to make the following description clearer, explicit reference will often be made hereinafter to a bar code reader (linear reader); of course, a man skilled in the art will recognize that what said is applicable to readers of different type, such as for example "swipe"-type two-dimensional optical code readers, where a 2D image is created by means of a stack of linear scans.

As it is known, a laser scanner device for reading an optical code typically comprises, in the simplest configuration thereof, an emission source of a laser light beam, a scanning optical element of said laser light beam on a support containing the optical code to be read, a collecting optical element of the light diffused or reflected by the illuminated optical code and a photoreceiver which is sensitive to the light diffused or reflected by the illuminated optical code in order to generate a photoelectric signal whose time modulation represents the information contained in the optical code.

The collecting optical element is for example a lens, which can focus the collected light into the photoreceiver. The collecting optical element defines an active optical area, in the lens embodiment this area is the lens' aperture; the light impinging on such active area is directed towards the photoreceiver.

The prior art scanning devices include—among others— the so called oscillating type scanning devices, name originating from the oscillating type of motion which the scanning optical element is subjected to.

With particular reference to the scanning devices of oscillating type, those known in the prior art are generally based on optical systems of retroreflective (where the outgoing laser beam and the incoming collected light beam are scanned synchronously and substantially lie in a common plane) or semiretroreflective (where the outgoing laser beam and the incoming collected light beam are scanned synchronously and lie in substantially parallel planes) type. These known scanning devices further comprise, typically, in addition to the optical element for scanning the light (briefly called in the following scanning element) and to the optical element to collect and direct the light (briefly, collecting element) towards the photoreceiver, a deflecting mirror for deflecting the laser beam emitted by the emission source towards the scanning element.

The deflecting mirror is either located in front or in the back of the collecting optical element, depending on the specific outline of the retroreflective scanning device. In both cases, Applicants have noted that there is a reduction in intensity of the collected light diffused or reflected from the optical code on the photoreceiver. This reduction is either due to the fact that the deflecting mirror is placed in front of the active area, with respect of the direction of propagation of the light from the optical code, thus some light from the optical code impinges on the deflecting mirror and not on the collecting element and cannot reach the photoreceiver, or a hole is realized in the collecting element in order to allow the laser light deflected from such a deflecting mirror to pass through it and to impinge on the scanning element, again reducing the usable active area.

The size of the "unused" active area of the collecting element, either covered or perforated, is particularly large when multi-laser scanning devices are used due to the presence of several laser beams, separated by a given distance, to be deflected. Multiple beams imply the presence of relatively wide deflecting elements or multiple deflecting elements.

An example of such a system is given in EP 0926615, in which a hole is formed on the collecting element (in this patent called optical receiver element 15) so that multiple laser beams can pass through.

A possible solution to the problem of intensity reduction due to active area reduction is to minimize the dimensions of the deflecting mirror to consequently minimize the decrease in the usable active area. Applicants have noted that this solution of realizing the deflecting mirror "as small as possible" presents several drawbacks, such as difficulties in the calibration and alignment of the various optical components, especially in multi-laser scanner devices. In the latter devices, a small deflecting mirror imposes very harsh alignment constraints.

Furthermore, in the known laser scanning devices, the laser beam illuminates the target containing the optical code to be read and it is scanned on it. This impinging light is both reflected and diffused from the optical code, and the diffused and reflected light is collected and detected by the scanning device in order to obtain information about the optical code. For this purpose, the photoreceiver, which includes for example a photodetector, generates an electrical signal having an amplitude determined by the intensity of the detected light, which is then analysed in order to "read" the optical code.

The intensity of light from the optical code, generally intending with this expression the light coming from the illuminated optical code by the laser beam, depends, as clear from the above, both on the intensity of the light diffused and on the intensity of the light reflected directly by the illuminated optical code.

In case the surface the optical code is printed or attached on is reflective and/or shiny, such as a metal sheet or a transparent plastic film, it can occur that the reflected component of the light is too bright for the photoreceiver and saturates the same. In other words, the photoreceiver may receive "peaks" of light intensity due to the laser light reflected onto the reflective/shiny surface. The remaining diffused light, carrying the information on the optical code structure, cannot be read because the photoreceiver is blinded by the amount of reflected light. This phenomenon is particularly relevant when the reflective/shiny surface on which the optical code is located is uneven and/or not homogeneous and/or the plane on which the optical code is scanned by the laser beam forms an angle of about 90° with the laser beam scanning direction itself.

As a possible solution to this blinding problem, in scanning devices including a polarized laser source emitting a polarized laser beam, it is known to position a polarizing filter on or adjacent to the photoreceiver. All light from the optical code and directed to the photoreceiver has to pass through it, and the filter substantially blocks light having a given polarization, so that the reflected component of the light from the optical code is substantially cancelled. Indeed, laser sources, such as laser diodes, may emit a polarized laser beam, generally linearly polarized. The reflected light on the optical code is also generally polarized with the same laser polarization, for example for an s-polarized laser beam the reflected light is also s-polarized, while the diffused light generally is non-polarized or polarized in a different plane than the reflected light. Therefore, the polarizing filter, substantially filtering out this polarized component, attenuates the polarized reflected light from the optical code and allows the non-polarized diffused (or scattered) light from the optical code to pass and reach the photoreceiver. The latter is thus not blinded by the reflected light and it can detect the intensity modulations of the diffused light, from which signals representing the optical code are obtained.

A polarizing filter located in front of a photodetector is shown in U.S. Pat. No. 5,602,376 where a polarizer filter 61 positioned to filter the light beam returning from said optical code is shown.

Applicants have realized that the provision of such a polarizing filter does not eliminate the "blinding" problem completely. Indeed, in the laser beam emitted by common laser sources, such as laser diodes, the ratio of the parallel and perpendicular vectors of polarization can reach a value of about 100 to 1 when operated near their maximum output power ratings. This "non-ideal" polarization ratio is further lowered by optical components, such as deflecting mirrors, present along the optical beam path within the scanning device, before the beam reaches the optical code to be scanned. Being the scanning laser beam not perfectly polarized on a single plane, also the reflected light is not perfectly polarized, lowering the efficiency of the introduced polarizing filter.

In addition, in those scanning devices which include more than a laser source, so that a total depth of field that is greater than that of a single laser is achieved, Applicants have observed the polarization of the two (or more) laser beams is almost never exactly coincident. Therefore, the polarizing filter can be optimized for only one of the laser sources, i.e., only the reflected light due to one of the two laser sources can be substantially filtered away, the other having a slightly different polarization can still "blind" the photoreceiver.

The mentioned patent U.S. Pat. No. 5,602,376 has as a principal object to prevent the undesired "exit reflections", which is laser light reflecting into the interior of the housing, being reflected back by the exit windows. For this purpose, the patent discloses an optical scanner unit with a window which is optimum for both transmitting therethrough light from inside the scanner to a target (e.g., a bar code) and for receiving therethrough light received from a target into the scanner. The window is tilted at Brewster's angle to permit light from inside the scanner to exit the laser scanner without "exit reflection" of light off the interior of the window; the window also permits light returned from the scanned target to enter the scanner and be sensed by a photodetector therein. The same window may be used for light transmitted to the photodetector and from the light source, the laser. The window is disposed at Brewster's angle relative to the scanning beam at the center of scan, and is close to Brewster's angle over the entire scan.

Applicants have noted that the window tilted at the Brewster's angle with respect to the scanning laser beam in reality is not tilted at such an angle for the whole scanning process of the optical code. The angle formed between the window and the light beam is equal to the Brewster one only in the center of the scanning range; during the remaining scanning interval the angle changes, not giving the desired results any more. In addition, in order to be at the Brewster's angle with respect to the laser light beam, the window is relatively large and inclined and thus further constraints on the casing design of the device are imposed.

The technical problem at the basis of the present invention is that of identifying a structural and layout configuration for a scanning device which allows reducing to a minimum or even eliminating the problem of the excess of light intensity reaching the photodetector which may "blind" the latter.

The present invention therefore relates, in a first aspect thereof, to a scanning device of a laser light beam for reading coded information, comprising:
  an emission source of a laser light beam, the light laser beam defining an optical path;
  an optical element for scanning the laser light beam on a support containing coded information;
  characterized in that it further comprises a linear polarizer located along the optical path of said laser beam, upstream the optical element for scanning, said polarizer being apt to linearly polarize a first portion of said laser light beam in substantially one first plane and to direct said first portion towards said optical element for scanning.

The word "substantially" used in the claim takes into account the fact that all polarizers have intrinsic limitations, i.e., they are not "ideal" and an efficiency of 100% is technologically not foreseeable.

The wording "upstream" and "downstream" always refer to a given direction of a propagating light beam along a given optical path. Therefore, as an example, a first optical element is "upstream" a second optical element if a light beam travelling along a given direction first impinges the first element and then the second.

The laser light beam from the emission source impinges on the polarizer and, from the latter, as output, a polarized beam is directed towards the scanning optical element in order to scan the coded information, e.g., the optical code. The plane on which the output beam is polarized depends on the polarizer construction.

The laser light beam can have no polarization or it can be already polarized before impinging on the polarizer of the invention, preferably along the same plane in which the linear polarizer is polarizing the output beam. In the latter case, the effect of the polarizer is to improve the polarization ratio of the laser light beam. Polarizing or improving the polarization ratio of the laser light beam before it impinges the scanning device also improves the polarization of the reflected beam from the optical code, thus allowing a more efficient filtering of the same. For example, having a better polarized reflected light with respect to the prior art scanner devices due to the presence of the polarizer located before the scanning optical element, with respect to the direction of the laser light beam, improves the selectivity and efficiency achieved by an additional polarizer located in front of the photoreceiver. In this way, the reflected polarized light can be relatively easily filtered out. The possibility of blinding the photoreceiver, due to the intensity peaks of the reflected light, is thus minimized.

According to a preferred embodiment, the linear polarizer is substantially transparent for a second portion of said laser light beam not directed towards said optical element for scanning.

In this preferred embodiment, the laser light beam is divided in two output beams by the linear polarizer, a first output beam including light polarized along a first plane and which is directed towards the optical element for scanning, and a second beam including the remaining light which is passing through the polarizer without being substantially modified by it.

More preferably, the scanning device further comprises
an optical element for collecting the light coming from said support;
a photoreceiver which is sensitive to the light collected from the collecting optical element, to generate a signal representative of the information contained in said support;
wherein said linear polarizer is located upstream of said collecting optical element in the propagating direction of said light coming from said support.

The polarizer is upstream the scanning optical element for the laser light beam and at the same time it is upstream the collecting optical element for the light coming from the support carrying information about the optical code. The light coming from the support includes both the reflected and the diffused light, which both impinge on the linear polarizer before being collected by the collecting optical element. The reflected light is mainly polarized along the first plane, due to the fact that the impinging laser light on the support is also polarized along the same plane, as already said. This polarized light along the first plane is in part not reaching the collecting optical element: the returning light from the support which impinges on the linear polarizer is filtered by it. Being this filtered part of the returning light mainly due to the reflected light, the information on the coded information carried by the diffused light, which carries the information on the optical code, is not changed considerably.

Thus, the need of a further polarizer to filter away the reflected light in front of the photoreceiver is reduced, the linear polarizer in a single optical element is achieving the function of a filtering element for the returning light, of a polarizing element for the scanning light, as well as the function of a reflecting mirror for the laser light beam towards the scanning element.

Moreover, being the linear polarizer substantially transparent for most of the diffused light, any obstruction in the optical path of the returning light from the support is eliminated, or at least minimized, thus maximizing the intensity of returning light collected by the photoreceiver.

Advantageously, the scanning device is retroreflective.

In a preferred embodiment, the scanning device includes a further emission source of a further laser light beam which defines a further optical path, said optical path of said laser light beam and said further optical path of said further optical light beam being substantially parallel, wherein said linear polarizer is located along the optical path of said laser light beam and along the further optical path of said further laser light beam and upstream the optical element for scanning in the propagation direction of the laser light beam and the further laser light beam.

Using the linear polarizer in connection with multiple laser beams scanning devices, allows a polarization, or an improvement of the polarization ratio, of all of the beams in a single step. When all laser beams coming from different sources impinge on the polarizer, the resulting light output by the polarizer towards the scanning element is all polarized along the same first plane, no substantial difference is present between different output beams coming from different input light beams. Therefore, the light impinging on the scanning optical element is substantially uniform in polarization, contrary to prior art multi-laser scanning devices where the polarizations of the different laser beams coming from different laser sources are often not well aligned. Again, the reflected component of the light coming from the support is also better polarized along a single plane and thus filtered away in an easier manner than in the prior art where it had a less definite polarization plane.

Advantageously, the emission source is apt to emit laser light substantially linearly polarized along a plane, said plane being coincident to the first plane.

The plane of polarization of the initial light beam emitted by the source and impinging on the linear polarizer and the first plane in which the linear polarizer polarizes a portion of the input light are preferably substantially coincident, so that the polarization ratio of the laser beam is improved and only a small fraction of intensity of the initial incident light beam is lost, being most of the light directed towards the scanning optical element.

Advantageously, the linear polarizer is apt to selectively reflect polarized light along said first plane contained in the laser light beam.

The polarizer has preferably the additional function of a deflecting mirror, deflecting the first-plane polarized component of the incident light beam towards the scanning optical element.

More preferably, in addition, the linear polarizer is apt to transmit a second portion of said laser light beam not polarized in said first plane.

In other words, the linear polarizer is transparent for the light not polarized along the first plane.

According to an embodiment, said linear polarizer includes a beam splitter.

Advantageously, said linear polarizer includes a first surface on which the laser light beam impinges and the laser light beam exiting said emission source is substantially s-polarized with respect to said first surface.

It is known that polarization vectors can be resolved into components which are parallel and perpendicular to the plane of incidence which is defined by the incident and reflective beams on the first surface of the polarizer. The component of the laser beam parallel to this plane is termed p-polarized and the component perpendicular to this plane is termed s-polarized.

As an example, the light beam emitted by the radiation source of the scanning device of the invention could be s-polarized with respect to the first surface of the linear polarizer and the polarization ratio is of about $10^{-3}$. In case of more than one source, generally the alignment error is of about 1°, which introduces a p component equal to about 0.01% with respect to the s component.

In a preferred embodiment, said linear polarizer includes a deflecting mirror located at the Brewster's angle for said laser light beam impinging on said linear polarizer.

A simple and economical solution to realize a linear polarizer which is apt to direct a polarized portion of the incident laser beam towards the scanning element includes the provision of a deflecting mirror located along the optical path of the laser light beam at an angle of incidence equal to the Brewster angle, i.e., at an angle of incidence at which the reflected light is linearly polarized with its electric field vectors perpendicular to the plane of incidence and parallel to the plane of the surface from which it is reflecting.

In a different embodiment, said linear polarizer includes a polarizing beam-splitter cube apt to split the laser light beam into two orthogonally polarized components.

A beam-splitter cube generally includes a cube, which is made from two triangular glass prisms which are connected, such as glued, together at their base. Their thickness is adjusted such that, for a certain wavelength, half of the light incident through one face of the cube is reflected and the other half is transmitted due to frustrated total internal reflection. Polarizing beam splitters, such as the Wollaston prism, use birefringent materials, splitting the incident light on one of their faces into beams of differing polarizations.

In a further different embodiment, said linear polarizer includes a window having opposed first and second surfaces, and further including a polarization selective coating covering said first surface engineered to separate s- and p-components of the incident laser light beam impinging on said first surface.

An optical coating is generally composed of a combination of thin film layers that create interference effects used to enhance transmission or reflection properties within an optical system. Optical coatings are commonly designed for a specific incident angle of light and for a specific polarization of light such as s-polarized, p-polarized, or random polarization. The provision of a window including a polarization selective coating allows a greater freedom of choice in the angle to be formed between the direction of propagation of the laser light beam and the windows itself due to the fact that the polarizing coating are engineered to separate the orthogonal components of the polarization of the impinging laser beam also at different angles than the Brewster's angle. Therefore, depending on the layout of the scanner, the appropriate polarizing coating can be selected, without imposing harsh constraints on the scanner device's construction.

Preferably, in this embodiment, the polarization selective coating is configured to reflect an s-polarization component of the incident laser beam and transmit a p-polarization component of the incident laser beam.

More preferably, said linear polarizer includes an anti-reflective coating which covers said second surface.

The polarizer preferably includes on the first surface where the laser light beam is impinging the polarizing coating, and in the second one an anti-reflective coating in order to reduce reflection. The anti-reflective coating minimizes the possibility of the appearance of a "ghost" light beam due to the p-component of the impinging light reflected by the second surface which passes undisturbed through the first surface, substantially transparent for the p-component.

In an advantageous embodiment, said first surface is forming an angle between about 40° and about 50° with the direction of propagation of said laser light beam.

In this angles' range, the overall device is more compact and the coating is easier to realize with respect to a coating requiring smaller or wider angles to polarize the impinging beam.

Alternatively, said first surface is forming a Brewster angle relative to the direction of propagation of said laser light beam impinging on said linear polarizer.

Locating the first surface at an angle equal to the Brewster's angle with respect to the laser light beam propagating direction allows a selection of a cheaper and relatively easily manufactured polarization coating.

Preferably, said linear polarizer includes an adjusting device to change the angle formed between said linear polarizer and the direction of propagation of said laser light beam.

In order to tune the angle formed between the linear polarizer and the laser light beam propagating direction, so that it remains always equal to the suitable angle for the polarization coating for which it is engineered to split the laser light beam in a polarized portion along said first plane, and a second portion, an adjusting device is provided. More preferably, the adjusting device is apt to tilt the linear polarizer around two perpendicular axes, a vertical and a horizontal axis, where the wording "vertical" and "horizontal" should not be construed in an absolute meaning, but reference is made to two axes substantially perpendicular and horizontal, respectively, to a board (PCB) where optical components, such as the linear polarizer, of the scanning device are preferably mounted.

In a preferred configuration, the optical path of said laser light beam between said linear polarizer and said optical element for scanning is free from further optical elements.

In other words, the linear polarizer is the last optical element on which the laser light beam impinges or passes through before being deflected by the scanning element. It is known that any optical element can impart a change, more or less significant depending on the element, on the polarization of a light beam. Therefore, the provision of the linear polarizer as the "last element" before the scanning element, minimize the possibility of altering the very good polarization achieved by the output laser light beam polarized by the polarizer itself.

Preferably, said optical element for collecting the light coming from said support defines an active area, light impinging on said active area being collected towards said photoreceiver, said linear polarizer having a surface wide enough to intercept light from said support upstream said active area substantially along all optical paths to said active area.

The light diffused and reflected from the support is directed at least in part towards said optical element for collecting the same. There are different optical paths along which the light, diffused or reflected, can travel in order to reach the active area of the collecting element. Light from the support not reaching the active area is not diverted towards the photoreceiver. For example, the photoreceiver can be a focusing lens and its aperture defines the active area. According to the invention, preferably, substantially all light the optical path of which is directed towards the active area, first reaches the linear polarizer. In this way, the linear polarizer filters substantially all light reaching the photoreceiver and the need of an additional polarizer located in front of the photoreceiver to avoid blinding of the same is avoided.

According to a preferred embodiment, the scanning device includes a light trap to trap a second portion of said laser light beam not directed towards said optical element for scanning.

The linear polarizer outputs a portion of the laser light beam towards the optical element for scanning. There is still a portion of the original laser beam which can for example be transmitted through the linear polarizer. In order to avoid that this fraction of the original laser beam is reaching the photoreceiver, thus being a source of error during the bar code scanning, a light trap is placed along the light optical path of this additional portion of light to absorb or confine the same.

The invention thus provides an improved optical scanner device which minimizes the blinding effect on the photoreceiver due to the reflected component of light from the optical code, and at the same time in a preferred embodiment can also minimize and even eliminate the presence of obstructions on the active area of the optical element for collecting light from the support where the coded information is present. These two improvements are obtained using a single element which is at the same time of simple and reliable construction and does not increase the costs of the overall device of a substantial amount.

The invention shall be better described hereafter with reference to some embodiments and examples, based on the attached drawings, wherein corresponding elements are designated by similar numbers. In the drawings.

Figure 1:
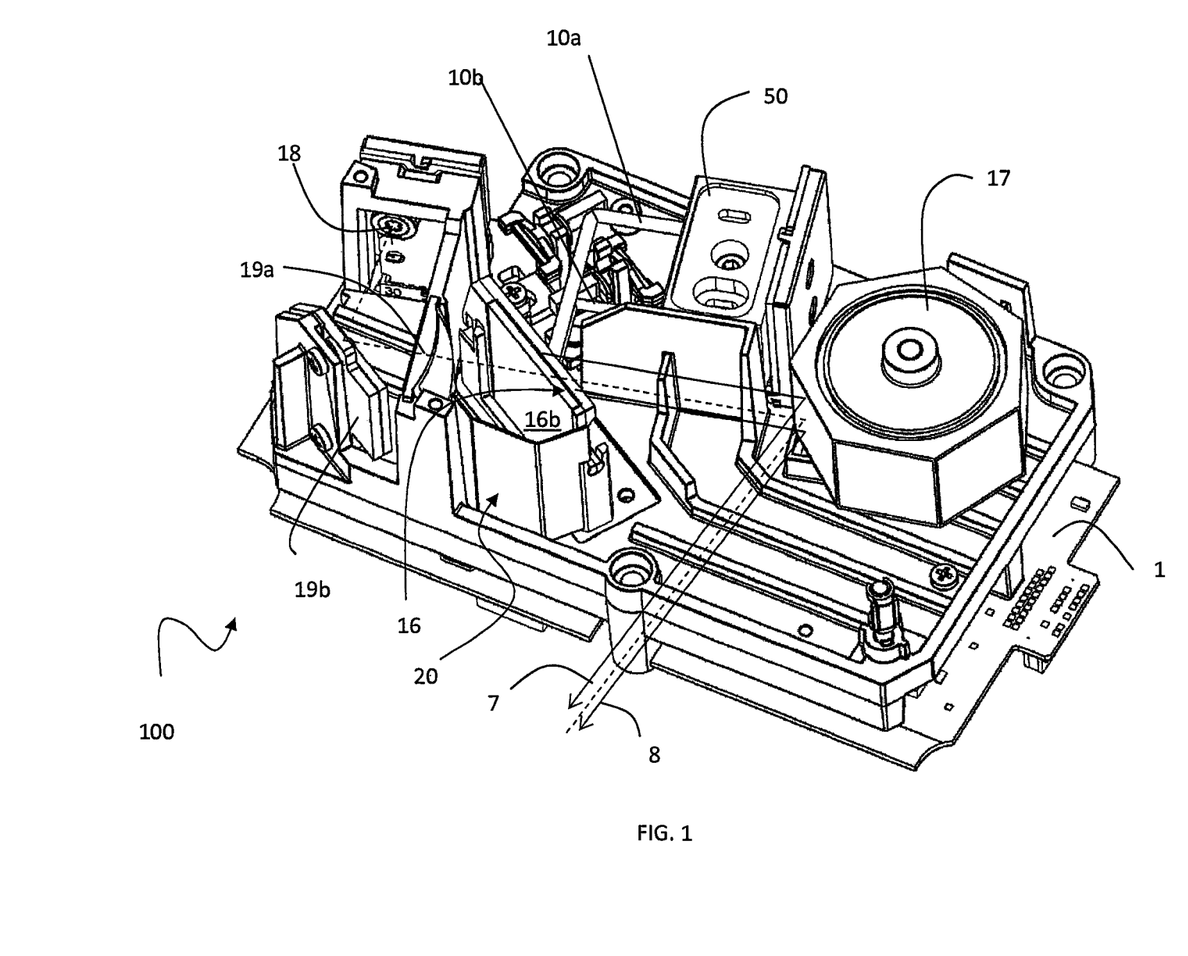
FIG. 1 is a schematic perspective view of a laser light beam scanning device realized according to the present invention.
Figure 2:
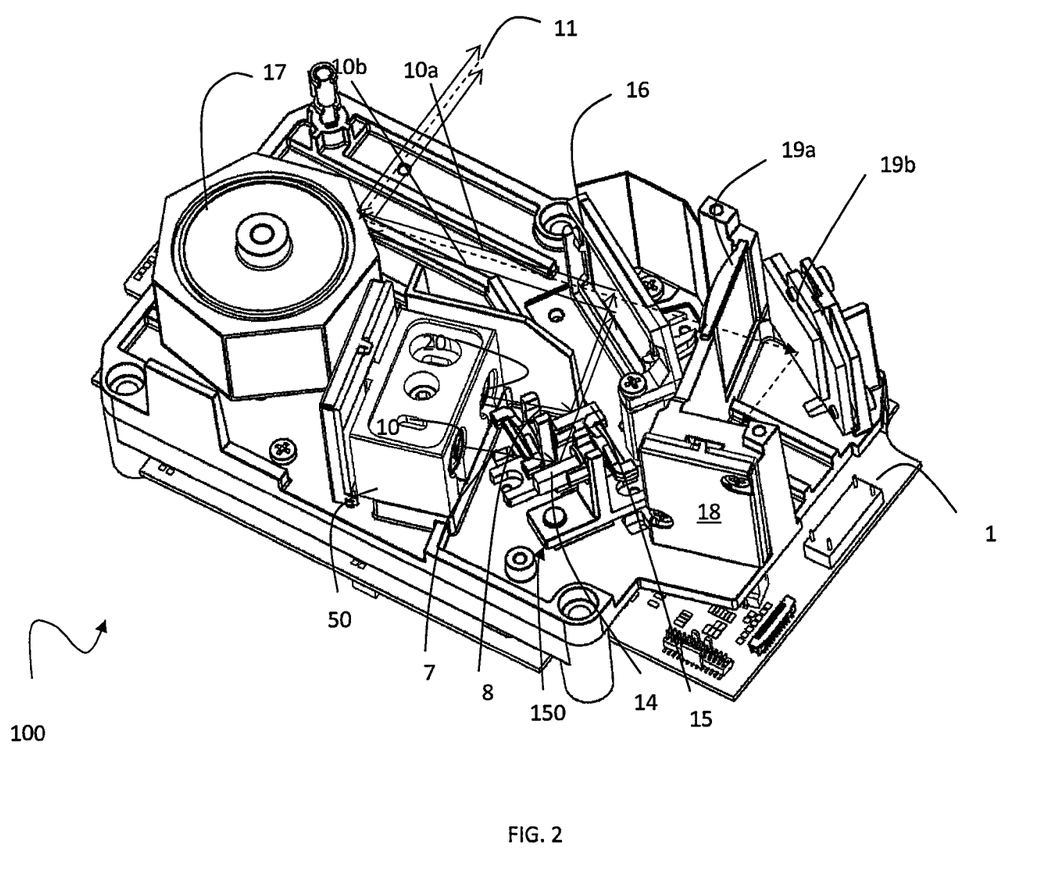
FIG. 2 is a schematic perspective view from a different angle of the laser beam scanning device of FIG. 1.

FIGS. 1 and 2 show an exemplary embodiment of a laser light beam scanning device (in the following, shortly, "scanning device") according to the present invention. In the figures, only the internal functional module of the scanning device is shown, a casing generally containing the same has been removed for clarity purposes so that the internal elements are visible. Functional module and scanning device will be both indicated with reference numeral 100.

The scanning device 100 is a scanning device typically used in systems for transporting and sorting items, such as mail, luggage, packages, etc. to detect data identifying the items in order to sort them in an intelligent manner.

In these systems, items are generally transported on a conveyor belt which is in relative movement with respect to the scanning device (which is normally fixed) and are sorted on the basis of the data present on an optical code associated to each item. The optical code is read by the scanning device.

The functional module 100 represented in FIGS. 1 and 2 includes a supporting plate 1 of the various optoelectronic and mechanical components of the scanning device.

The device 100 comprises two optical groups 10, 20, preferably identical one to the other. Each optical group includes a corresponding emission source (not visible in the figures) of a laser light beam 7, 8; such beams 7, 8 being emitted along an optical emission path 10a, 10b (FIGS. 1, 2) having each an optical axis. The emission source can be for example a semiconductor diode laser. Associated to each laser source, preferably a focusing element is present (also not visible), aligned with the laser source.

In FIGS. 1 and 2, each one of the optical paths 10a, 10b travelled by laser beams 7, 8 is depicted as a solid line ending with an arrow.

Laser beams are preferably linearly polarized, more preferably along a first plane. Typically, their polarization ratio is of about $10^{-3}$.

It is to be understood that the device 100 might include, in a non-depicted embodiment, a single optical group, or more than two groups, identical or different one from the other(s).

In the operating configuration of the device 1, the optical groups 10, 20 are housed in a single block element 50 mounted on the supporting plate 1 and are arranged in such a manner that the optical paths 10a, 10b defined by the light beams 7,8 emitted by the sources are substantially parallel to the supporting plate (thus in this embodiment horizontal) and parallel to each other.

Furthermore, the device 100, downstream of the emission sources and along the optical emission path 10a, 10b, comprises an optical deflection system 150, including a first and a second deflecting mirror 14, 15 to deflect the first and the second light beam 7,8, respectively. Downstream the optical deflection system 150, mounted on the supporting plate 1, a linear polarizer 16 is located. On the linear polarizer, both laser beams 7, 8 impinge and are deflected, by the linear polarizer itself, towards an optical element for scanning 17. The optical element for scanning is of a conventional type and in the depicted embodiment includes a rotating polygonal mirror operated by an electrical motor (not shown) for deflecting the laser light beams 7,8 emitted by the emission sources, in this way generating the scanning lines to read an optical code located on a support (also not shown).

The scanning element 17 carries out the scanning of the light beam emitted by the sources on the optical code (not illustrated) to be read and collects the diffused or reflected light coming from the illuminated optical code for the subsequent detection step, as will be better described below. In other words, the device 100 is retroreflective.

The path 11 of the light diffused and reflected by the optical code is depicted in FIGS. 1 and 2 as a dashed line ending by an arrow.

The functional module 100 further comprises a photoreceiver 18, for example one or more, photodiodes or a CCD or a C-MOS device, for receiving the light diffused by the optical code, deflected by the polygonal mirror 17 and passed through the linear polarizer 16, and generating an electrical signal indicating the intensity thereof.

Between the photoreceiver 18 and the linear polarizer 16, an optical element for collecting light, such as lens 19a, is positioned, for collecting the light coming from the support and focusing it on the photoreceiver 18. Moreover, an additional deflecting mirror 19b is located to divert the light focused by lens 19a on the photoreceiver 18, if needed.

Thus, in the depicted embodiment of FIGS. 1 and 2, the optical path 10a, 10b of each laser beams 7, 8 includes a first rectilinear section between the emission source (e.g., the monolithic block 50) and the respective deflecting mirror 14, 15, a second rectilinear section from the deflecting mirror 14,15 and the linear polarizer 16 and a third rectilinear section from the linear polarizer 16 to the optical element for scanning 17. From the scanning element 17, the optical beams are further deflected towards the support bearing the optical code to be scanned forming a fourth rectilinear section.

The optical path 11 of the diffused and reflected light from the support where the optical code is includes a first rectilinear section from the code's location to the optical element for scanning 17, a second rectilinear section from the optical element for scanning 17 to deflecting mirror 19*b*, and a terminal third rectilinear section from the deflecting mirror 19*b* to the photoreceiver 18.

As visible, optical element for scanning 17, linear polarizer 16 and lens 19*a* are so positioned in the supporting plate 1 that all diffused & reflected light coming from the support the optical path 11 of which would reach the lens 19*a*, first passes through the linear polarizer 16. This means that all light coming from the support that, without the presence of the linear polarizer, would reach the photoreceiver, passes through the linear polarizer 16.

Figure 6:
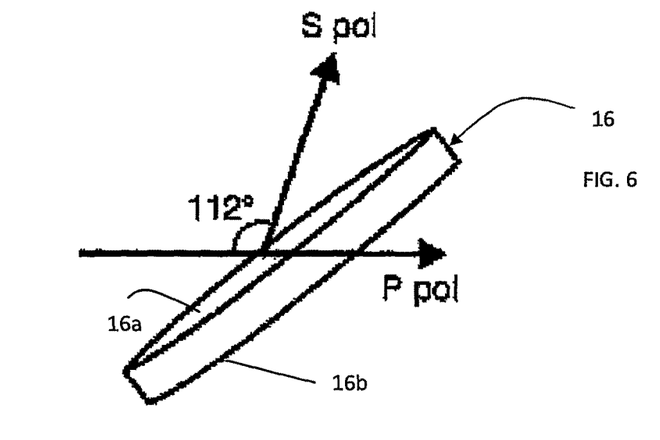
FIG. 6 is a simplified functional form of the component of FIG. 5.

The linear polarizer 16 is shown in a simplified functional form in FIG. 6. As shown in the figure, the linear polarizer includes a first and a second surface, 16*a*, 16*b*. The first surface is defined as the one on which the laser light 7, 8 impinges coming from the emission sources, while the second surface is the one from which the transmitted beam emerges. In case of many emission sources, all the light beams emitted by them impinge on the same linear polarizer. The linear polarizer 16 acts as a beam splitter on the impinging laser beams 7, 8: it deflects the component along the first plane of the impinging laser beams 7, 8 and it is substantially transparent for the perpendicular component which passes unchanged. Preferably, the s-component of polarization is deflected and the p-component is transmitted; these two components are depicted with two different arrows in FIG. 6 departing from the linear polarizer 16. In the depicted embodiment of FIGS. 1 and 2, the laser beams 7, 8 emitted by the laser sources are polarized along said first plane and this first plane coincide with the s-plane of the first surface, i.e., the two beams 7, 8 are both s-polarized with respect to the first surface 16*a* of the linear polarizer 16. The initial polarization ratio of beams 7,8 upstream the linear polarizer could be $<10^{-3}$ and the two polarizations of the first and second beam 7, 8, could be not perfectly aligned. When the two beams both impinge on the first surface 16*a* of the linear polarizer 16, the resulting two beams output by it directed towards the scanning polygon 17 have an improved polarization than the input one and are also substantially aligned one to the other, because only the s-polarization is deflected, the portion of light of the two beams having a p-polarization is passing through the linear polarizer 16.

The optical path of the two laser beams 10*a*, 10*b* before described also include an additional section defined by the p-polarized light portion of the beams passing through the linear polarizer 16 and not directed by the latter towards the scanning element 17. However, this portion of the laser beams is preferably trapped and absorbed by light trap 20, which is realised in the embodiment of FIG. 1 as a light absorbing screen, preferably painted with a light absorbing black coating; several coatings of this type are known in the field of photography; alternatively a serrated surface or a cone shaped absorber can be used.

Thus, linear polarizer 16 has both the function of a beam splitter, of a polarizer and of a deflecting mirror: it reflects light polarized along the s-plane and transmits light polarized along the p-plane. The light beams reflected by the linear polarizer are then impinging on the scanning element 17 and the light scanning the optical code is better polarized than without the linear polarizer.

Linear polarizer 16 can be realized in many different ways. In a first embodiment of the invention, depicted in FIG. 5, the linear polarizer includes a window having the first and the second surface 16*a*, 16*b* parallel one to the other. In a first embodiment, the first surface 16*a* is a deflecting mirror and it is located at the Brewster's angle for the impinging light beams 7, 8. The Brewster's angle depends on the refractive indices n of the media in which the light beam is travelling, for example for an air-optical glass (such as BK7, n=1.51680) interface it is of about 56.7°. In this way, at the Brewster's angle, the s-polarized component of the light beams 7, 8 is automatically reflected towards the scanning element 17.

Figures 3, 4, 5:
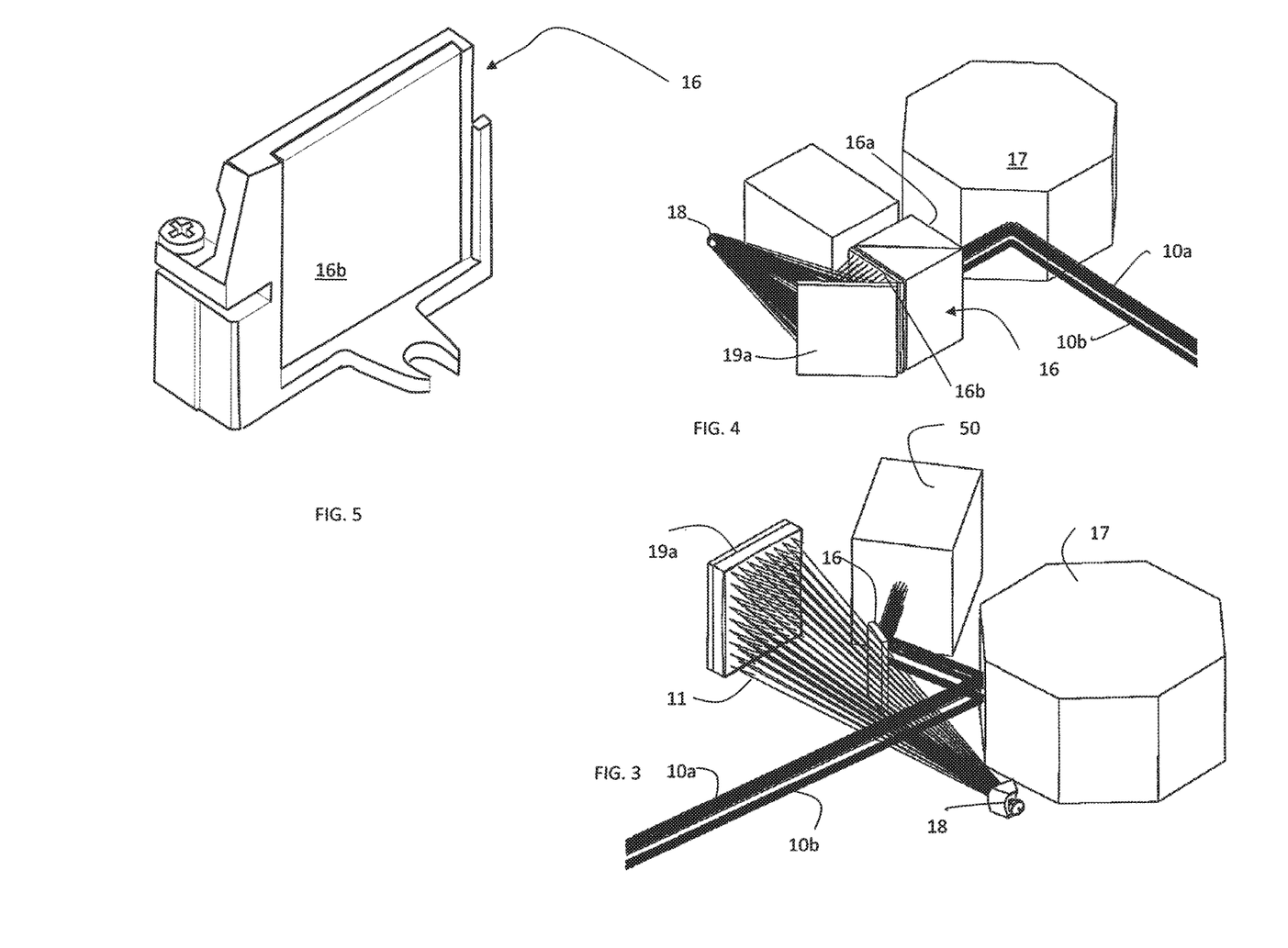
FIG. 3 is a perspective view of a component of the scanning device of FIG. 1 or 2 in an enlarged view and in a different embodiment than in FIGS. 1 & 2.
FIG. 4 is a perspective view of a further embodiment of the component of the scanning device of FIG. 3 in an enlarged view.
FIG. 5 is a perspective view of the component of FIGS. 1 and 2 in an enlarged view.
Figure 7:
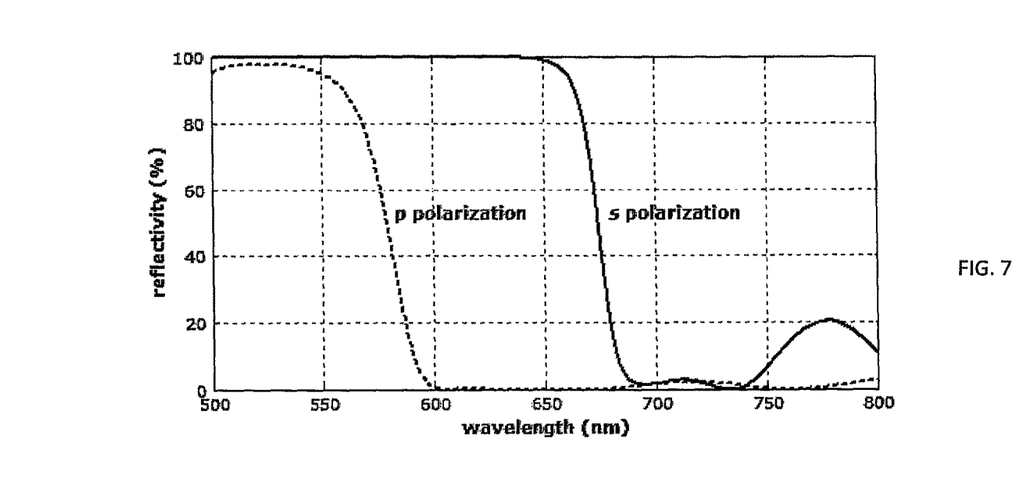
FIG. 7 is a datasheet of a coating used in an embodiment of the invention.

In a different embodiment, the windows of FIG. 5 is located at an angle of about 45°±5° and the first surface 16*a* on which the laser beams 7, 8 impinge is coated by a polarization selective coating in order to separate the s and p-components of the impinging laser light beams 7,8. A typical datasheet of such a coating is depicted in FIG. 7: for a given range of wavelengths of the impinging light beam, the coating on the first surface reflects completely the s-polarized component and does not affect the p-component. The coating is selected depending on the wavelength of the laser beams and on the angle of incidence of the same.

As a non-limiting example, a possible coating is the one designed by Thorlabs®, which offers polarizing plate beamsplitters with narrowband beamsplitting coatings deposited on the front surface and which are designed to be used at a 45° angle of incidence.

These beamsplitters are designed such that upon incidence the s-polarized light will be reflected at a 45° angle while the p-polarized light is transmitted. Therefore, these beamsplitters can be thought of as a 45° high reflector with the two reflection bands offset to allow high transmission of the p-polarized component and simultaneous high reflectance of the s-polarized component.

Preferably, even in the embodiment in which the linear polarizer 16 is located at the Brewster's angle for the impinging light beam 7, 8, the first surface 16*a* is covered by a polarizing coating to enhance the s and p peak transmittance. An example of such a coating is the one realized by Lambda®.

In a different embodiment of the invention, depicted in FIG. 4, the linear polarizer 16 includes a polarizing beam splitter cube 21. As a non-limiting example, such a cube is one of those produced by Rocky Mountain Instrument Inc. The function of the cube is analogous to that of the above described window: it splits the impinging light beam 7, 8 in two components, the p-polarized one which is transmitted and the s-polarized one which is deflected. In the cube, also a first surface 16*a* can be identified as the impinging surface and a second surface which is the one from which the transmitted light portion emerges.

The linear polarizer 16, either in the form of a window or in the form of a cube, is mounted on the plate 1 by means of movable brackets 40 so that the linear polarizer 16 can be tilted accordingly depending on the overall layout of the device 100, such as the location of the emission sources. In particular, preferably brackets allow a suitable horizontal and vertical tilting.

On the second surface 16*b* of the linear polarizer 16, an anti-reflecting coating is deposited so that the transmitted p-component is not reflected on it, creating a ghost beam directed towards the scanning element 17.

The functioning of the device 100 is as follows.

As mentioned, the two laser beams 7, 8 emitted by the respective sources are first impinging deflecting mirrors 14, 15 and then reach the linear polarizer 16. Additional optical elements, such as additional deflecting mirrors or focusing lenses, can be envisaged as well in the optical path 10a, 10b of beams 7, 8 between the emission sources and the linear polarizer 16. At the linear polarizer 16, both beams 7, 8 impinge on its first surface 16a and are split in two components, thanks to the polarizing coating or to the fact that the angle of incidence is equal to the Brewster's angle, the s-component of each beam is directed towards the scanning element 17, while the p-component passes through the linear polarizer 16, emerging from the second surface 16b, and it is then trapped and/or absorbed by the light trap. The two output beams directed towards the polygon 17—substantially only s-polarized—impinge the latter and create the scanning beam for the target optical code.

In order to keep the optimal polarization achieved by the beams output by the linear polarizer, no further optical elements are interposed between the linear polarizer and the scanning element 17.

The diffused and reflected light by the optical code also impinges the scanning element 17 and from it is directed to the linear polarizer 16. Due to the fact that the impinging light on the optical code is substantially all s-polarized, the reflected light is s-polarized as well. This s-polarized light, reaching the linear polarizer 16 and impinging on the first surface 16a, is deflected and not transmitted, due to the polarizing effect of the filter. Therefore, substantially only the diffused light from the optical code, which carries the information about the code, is reaching the lens 19a and thus the photoreceiver 18.

Preferably, as depicted in FIGS. 4 and 5, the first surface 16a of the linear polarizer 16 is wide enough to intercept all light reflected or diffused by the optical code the optical path of which could reach the lens 19a and thus photoreceiver 18.

In a different embodiment of the invention, not depicted, an additional polarizing filter could be used to coat the photoreceiver or lens 19a to further minimize the risk that reflected light from the optical code is reaching the photoreceiver itself blinding the same.

The layout of the scanning device of the invention 100 thus allows to reduce the risks of blinding the photoreceiver and does not increase the complexity of the construction, being the linear polarizer a multi-purpose element.

The invention claimed is:

1. A scanning device of a laser light beam for reading coded information, comprising:
    a first emission source of a first laser light beam, the first laser light beam defining a first optical path;
    a second emission source of a second laser light beam, the second laser light beam defining a second optical path, portions of the first and second optical paths being vertically aligned and substantially parallel with one another;
    an optical element for scanning the first and second laser light beams vertically aligned and substantially parallel with one another on a support containing coded information;
    a linear polarizer located along the first and second parallel optical paths of the first and second laser light beams, upstream of the optical element for scanning in the propagation direction of the first laser light beam and the second laser light beam vertically aligned and substantially parallel with one another, the linear polarizer configured to:
        linearly polarize a first portion (s) of the first and second laser light beams vertically aligned and substantially parallel with one another and in substantially one first plane, and reflect the polarized portion towards the optical element, thereby causing the first portion (s) to be used when performing a scan; and
        be substantially transparent for a second portion (p) of the first and second laser light beams, thereby causing the second portion (p) to substantially not be directed towards the optical element so as to substantially not be used when performing a scan.

2. The scanning device according to claim 1, further comprising an optical element for collecting the light coming from the support;
    a photoreceiver, which is sensitive to the light collected from the collecting optical element, to generate a signal representative of the information contained in the light coming from the support; and
    wherein the linear polarizer is located upstream of the collecting optical element in the propagating direction of the light coming from the support, and configured to be substantially transparent to at least a portion of the light coming from the support.

3. The scanning device according to claim 2, wherein the optical element for collecting the light coming from the support defines an active area, light impinging on the active area being collected towards the photoreceiver, the linear polarizer having a surface wide enough to intercept light from the support upstream the active area substantially along all optical paths to the active area.

4. The scanning device according to claim 2, further comprising an optical deflector disposed between the collecting optical element and the photoreceiver, and configured to deflect the light coming from the support and collected by the collecting optical element.

5. The scanning device according to claim 1, the scanning device being retroreflective.

6. The scanning device according to claim 1, wherein the emission source is configured to emit laser light substantially linearly polarized along a plane, the plane being coincident to the first plane.

7. The scanning device according to claim 6, wherein the linear polarizer includes a first surface on which the laser light beam impinges and wherein the laser light beam exiting the emission source is substantially s-polarized with respect to the first surface.

8. The scanning device according to claim 1, wherein the linear polarizer is configured to selectively reflect polarized light along the first plane contained in the first and second laser light beams.

9. The scanning device according to claim 8, wherein the linear polarizer is configured to transmit a second portion of the laser light beam not polarized in the first plane.

10. The scanning device according to claim 1, wherein the linear polarizer includes a beam-splitter.

11. The scanning device according to claim 1, wherein the linear polarizer includes a deflecting mirror located at a reflection angle for the laser light beam impinging on the linear polarizer, the reflection angle having an angle of incidence at which the reflected light is linearly polarized with its electric field vectors perpendicular to the plane of incidence and parallel to the plane of the surface from which it is reflecting.

12. The scanning device according to claim 1, wherein the linear polarizer includes a polarizing beam-splitter cube configured to split the laser light beam into two orthogonally polarized components.

13. The scanning device according to claim 1, wherein the linear polarizer includes a window having opposed first and second surfaces, and further including a polarization selective coating covering the first surface engineered to separate s- and p-components of the incident laser light beam impinging on the first surface.

14. The scanning device according to claim 13, wherein the polarization selective coating is configured to reflect an s-polarization component of the incident laser beam and transmit a p-polarization component of the incident laser beam.

15. The scanning device according to claim 13, wherein the linear polarizer includes an anti-reflective coating which covers the second surface.

16. The scanning device according to claim 13, wherein the first surface is forming an angle between about 40° and 50° with the direction of propagation of the laser light beam.

17. The scanning device according to claim 13, wherein the first surface is forming a reflection angle relative to the direction of propagation of the laser light beam impinging on the linear polarizer, the reflection angle having an angle of incidence at which the reflected light is linearly polarized with its electric field vectors perpendicular to the plane of incidence and parallel to the plane of the surface from which it is reflecting.

18. The scanning device according to claim 1, wherein the linear polarizer includes an adjusting device to change the angle formed between the linear polarizer and the direction of propagation of the laser light beam.

19. The scanning device according to claim 1, wherein the optical path of the laser light beam between the linear polarizer and the optical element for scanning is free from further optical elements.

20. The scanning device according to claim 1, including a light trap to trap a second portion of the laser beam output by the linear polarizer not directed towards the optical element for scanning.

21. The scanning device according to claim 1, further comprising one further optical deflector that is arranged to deflect the further laser light beam in parallel and in vertical alignment with the laser light beam deflected from the optical deflector, the further optical deflector deflecting the further laser light beam from the further emission source to the linear polarizer.

22. The scanning device according to claim 1, further comprising one optical deflector disposed along the optical path of the laser beam between the emission source and the linear polarizer, the optical deflector deflecting the laser light beam from the emission source to the linear polarizer.

* * * * *